United States Patent
Chuang

(10) Patent No.: US 9,578,673 B2
(45) Date of Patent: Feb. 21, 2017

(54) METHOD OF CHANGING UE MOBILITY STATE IN RRC CONNECTED MODE

(71) Applicant: ACER INCORPORATED, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/863,407

(22) Filed: Sep. 23, 2015

(65) Prior Publication Data

US 2016/0095158 A1 Mar. 31, 2016

Related U.S. Application Data

(60) Provisional application No. 62/055,665, filed on Sep. 26, 2014.

(30) Foreign Application Priority Data

Sep. 7, 2015 (TW) .............................. 104129460 A

(51) Int. Cl.
 *H04W 8/08* (2009.01)
 *H04W 76/04* (2009.01)
 *H04W 52/02* (2009.01)
 *H04W 36/00* (2009.01)

(52) U.S. Cl.
 CPC ............ *H04W 76/046* (2013.01); *H04W 8/08* (2013.01); *H04W 36/0055* (2013.01); *H04W 36/0083* (2013.01); *H04W 52/0216* (2013.01); *H04W 52/0251* (2013.01); *H04W 52/0264* (2013.01)

(58) Field of Classification Search
 CPC .. H04W 76/046; H04W 8/08; H04W 36/0055; H04W 36/0083; H04W 52/0251; H04W 52/0264; H04W 52/0216

See application file for complete search history.

(56) References Cited

U.S. PATENT DOCUMENTS

| 2013/0040692 A1* | 2/2013 | Chen ...................... H04W 36/04 455/525 |
| 2013/0122918 A1 | 5/2013 | Boley |
| 2014/0051454 A1 | 2/2014 | Wirtanen |

(Continued)

FOREIGN PATENT DOCUMENTS

WO 2013050002 A1 4/2013

OTHER PUBLICATIONS

Ericsson, RRC protocol states, TSG-RAN Working Group 2 (Radio layer 2 and Radio layer 3) Sophia Antipolis, Aug. 16-20, 1999, TSGR2#6(99)807, XP050113338.

*Primary Examiner* — Chuong A Ngo
(74) *Attorney, Agent, or Firm* — Winston Hsu; Scott Margo

(57) ABSTRACT

In a wireless communication system, a user equipment is configured to establish an RRC link with a cell when operating in a first mobility state or a second mobility state of an RRC connected mode. When all currently running application programs only cause background traffic or do not require short data latency, the user equipment is configured to maintain in or switch to the first mobility state having a lower monitoring frequency. When any of the currently running applications involves user interaction or requires short data latency, the user equipment is configured to maintain in or switch to the second mobility state having a higher monitoring frequency.

9 Claims, 4 Drawing Sheets

(56) References Cited

U.S. PATENT DOCUMENTS

2014/0204815 A1     7/2014  Ismail
2014/0349659 A1*   11/2014  Ishii .................... H04W 8/082
                                                                455/444
2015/0009816 A1*    1/2015  Hsu .................. H04W 28/0221
                                                                370/230.1

* cited by examiner

METHOD OF CHANGING UE MOBILITY STATE IN RRC CONNECTED MODE

CROSS REFERENCE TO RELATED APPLICATIONS

This application claims the benefit of U.S. provisional application No. 62/055,665 filed on Sep. 26, 2014.

BACKGROUND OF THE INVENTION

1. Field of the Invention

The present invention is related to a method of changing a user equipment mobility state in the RRC connected mode, and more particularly, to a method of changing a user equipment mobility state in the RRC connected mode based on background traffic or monitor requirement.

2. Description of the Prior Art

The $3^{rd}$ Generation Partnership Project (3GPP) has developed various wireless communication networks. A universal mobile telecommunications system (UMTS) or a global system for mobile communications edge radio access network (GERAN) is a $3^{rd}$ generation (3G) network which adopts a wideband code division multiple access (WCDMA) technology capable of providing high frequency spectrum utilization, universal coverage, and high-speed/quality multimedia data transmission. In the UMTS network, a radio access network known as a universal terrestrial radio access network (UTRAN) includes multiple cells, commonly known as Node-Bs (NBs), for communicating with multiple user equipment (UE). A long term evolution (LTE) system is a $4^{th}$ generation (4G) network which includes a new radio interface and radio network architecture capable of providing a high data rate, low latency, packet optimization, and improved system capacity and coverage. In the LTE network, a radio access network known as an evolved UTRAN (E-UTRAN) includes multiple evolved NBs (eNBs) for communicating with multiple UEs and a core network which includes a mobility management entity (MME), a serving gateway and other devices for non-access stratum (NAS) control.

According to 3GPP specifications, after selecting a public land mobile network identity (PLMN), the UE may perform a cell selection procedure and a cell reselection procedure in order to use related network services. The cell selection procedure allows the UE to quickly camp on a serving cell, thereby receiving system information from the PLMN, establishing radio resource control (RRC) links, accessing network via control channels, and receiving/replying paging messages. The cell reselection procedure allows the UE to camp on another target cell having better signal quality than the current serving cell for better performance.

Multiple application programs may be run on a UE at the same time. For example, a user may read an electronic book (E-book) on the UE with telecommunications application software being executed in the background environment. The execution of each application program may involve user interactive commands and/or non-user interactive commands. For example, since the user may issue commands for turning pages, making remarks or adding bookmarks while reading an E-book, the E-Book interface is a user interactive application program. Meanwhile, the telecommunications application software is a non-user interactive application program since it only causes background traffic. Background traffic includes keep-alive messages automatically sent by the UE to the base station, but does not involve any active commands issued by the user. Similarly, once the user switches to the interface of the telecommunications application software for browsing a new message, the telecommunications application software becomes a user interactive application program, while the E-Book interface executed in the background environment becomes a non-user interactive application program.

In a prior art wireless communication system, even if the user does not actively engage in any application program, the modem of the UE is still turned on by background traffic caused by non-user interactive application programs, thereby increasing power consumption. Even if user interactive application programs and non-user interactive application programs have different requirements for data latency, the prior art wireless communication system fails to change the mobility state of the UE accordingly, thereby causing high handover failure rate. Meanwhile, the current mobility state of the UE may not be able to meet the monitor requirement of the network, thereby causing unnecessary power consumption or high handover failure rate.

SUMMARY OF THE INVENTION

The present invention provides a method of changing a user equipment mobility state based on background traffic. The method includes a user equipment establishing a first RRC link with a cell when operating in a first mobility state of an RRC connected mode; the user equipment sending a first message to the cell when the user equipment remains operating in a background mode longer than a predetermined period of time after having established the first RRC link; and the user equipment switching from the first mobility state to a second mobility state of the RRC connected mode when the user equipment is able to receive a second message from the cell before a first timer expires. The first message is associated with changing the user equipment mobility state. The second message is associated with approving a change of the user equipment mobility state. A first monitor frequency of the user equipment when operating in the first mobility state is higher than a second monitor frequency of the user equipment when operating in the second mobility state. All application programs run on the user equipment are non-user interactive when the user equipment operates in the background mode.

The present invention also provides a method of changing a user equipment mobility state according to background traffic. The method includes a user equipment establishing a first RRC link with a cell when operating in a first mobility state of an RRC connected mode; the user equipment sending a first message to the cell when the user equipment exits a background mode after having established the first RRC link; and the user equipment switching from the first mobility state to a second mobility state of the RRC connected mode when the user equipment is able to receive a second message from the cell before a first timer expires. The first message is associated with changing the user equipment mobility state. The second message is associated with approving a change of the user equipment mobility state. The first monitor frequency of the user equipment when operating in the first mobility state is lower than a second monitor frequency of the user equipment when operating in the second mobility state. All application programs run on the user equipment are non-user-interactive when the user equipment operates in the background mode.

The present invention also provides a method of changing a user equipment mobility state according to monitor requirement. The method includes a user equipment establishing a first RRC link with a cell when operating in a first mobility state of an RRC connected mode; and the cell requesting the user equipment to switch from the first mobility state to a second mobility state of the RRC connected mode when determining that the first mobility state does not meet a monitor requirement of the user equipment, wherein the second mobility state meets the monitor requirement of the user equipment.

These and other objectives of the present invention will no doubt become obvious to those of ordinary skill in the art after reading the following detailed description of the preferred embodiment that is illustrated in the various figures and drawings.

DETAILED DESCRIPTION

The present method of changing UE mobility state in the RRC connected mode according to background traffic or monitor requirement may be applied to a wireless communication system which includes a UE and a plurality of cells. Each cell may be an NB of a UTRAN, an e-NB of a EUTRAN, or a base station of another type of network. The UE may include any device with telecommunication capabilities, such as mobile phones, personal digital assistants, handheld computers, tablet computers, nettop computers, or laptop computers. However, the types of the cells and the UE do not limit the scope of the present invention.

Figure 1:
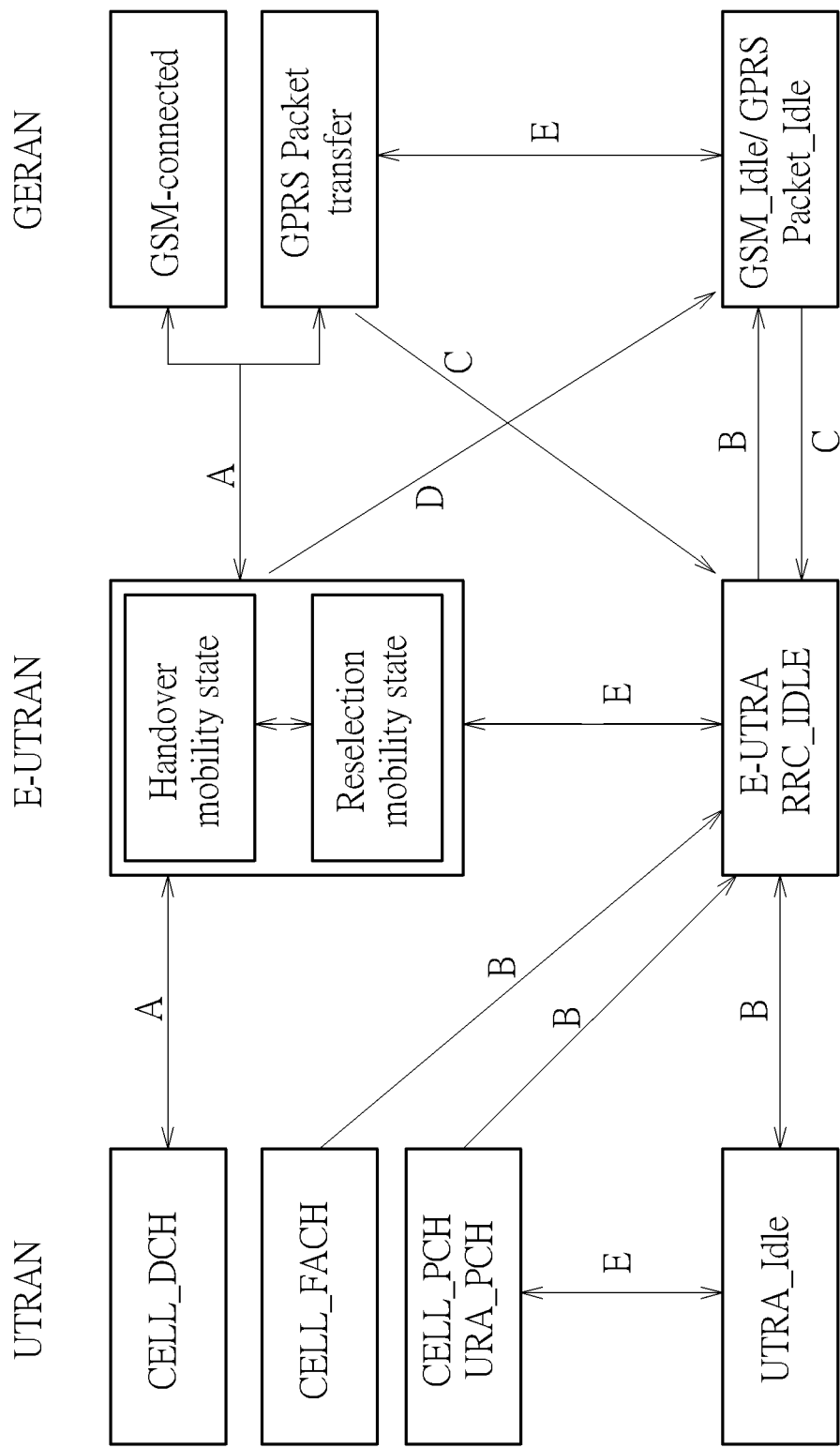
FIG. 1 is a diagram illustrating the mobility support provided by various types of cells for UE operation.

FIG. 1 is a diagram illustrating the mobility support provided by various types of cells for UE operation. In the present invention, the UE may perform a cell selection procedure or a cell reselection procedure on multiple cells of various types. A 2G GERAN structure, a 3G UTRAN structure and a 4G E-UTRAN structure are used for illustrative purpose in FIG. 1. However, the types of radio access technologies adopted by the cell do not limit the scope of the present invention.

In FIG. 1, multiple arrows are used to represent possible UE operations between different types of cells. The arrow designated by A represents a handover procedure. The arrow designated by B represents a cell reselection procedure. The arrow designated by C represents a cell change order (CCO) procedure. The arrow designated by D represents a network assisted cell change (NACC) procedure. The arrow designated by E represents a link establishment/release procedure. The operations represented by arrows A-E are defined in detail in corresponding 3GPP specifications.

The coverage range corresponding to the 2G GERAN structure is depicted on the right of FIG. 1. For the 2G GERAN environment, the RRC connected mode of the UE includes a GSM_Connected mobility state and a GPRS packet transfer mobility state, while the RRC idle mode of the UE includes a GSM_Idle/GPRS Packet_Idle mobility state. Each mobility state under the 2G GERAN structure is defined in detail in corresponding 3GPP specifications.

The coverage range corresponding to the 3G UTRAN structure is depicted on the left of FIG. 1. For a 3G UTRAN environment, the RRC connected mode of the UE includes a CELL-DCH mobility state, a CELL-FACH mobility state, a CELL-PCH mobility state and a URA-PCH mobility state, while the RRC idle mode of the UE includes a UTRA_Idle mobility state. Each mobility state under the 3G UTRAN structure is defined in detail in corresponding 3GPP specifications.

The coverage range corresponding to the 4G E-UTRAN structure is depicted in the middle of FIG. 1. For a 4G E-UTRAN environment, the RRC connected mode of the UE includes a handover mobility state and a reselection mobility state, while the RRC idle mode of the UE includes an E-UTRA RRC Idle mobility state.

In the present invention, the handover mobility state is characterized in that the UE is assigned with a dedicated channel for uplink/downlink transmission, a uplink/downlink shared channel, or any combination of above. In other words, the UE is able to maintain instant communication with the E-UTRAN cell by monitoring the assigned channel on a real-time basis when operating in the handover mobility state, but at the cost of higher power consumption.

In the present invention, the reselection mobility state is characterized in that there is no dedicated physical channel between the UE and the E-UTRAN cell. The UE is configured to periodically monitor a shared channel for either uplink or downlink transmission. In other words, since the monitor frequency of the UE when operating in the reselection mobility state is lower than the monitor frequency of the UE when operating in the handover mobility state, power consumption can be reduced. However, the UE is unable to maintain instant communication with the E-UTRAN cell when operating in the reselection mobility state.

During a period when an RRC link is established between the UE and the E-UTRAN cell under the 4G network structure, the present invention provides a method of changing a UE mobility state according to background traffic or monitor requirement for reducing power consumption and improving handover failure rate.

Figure 2:
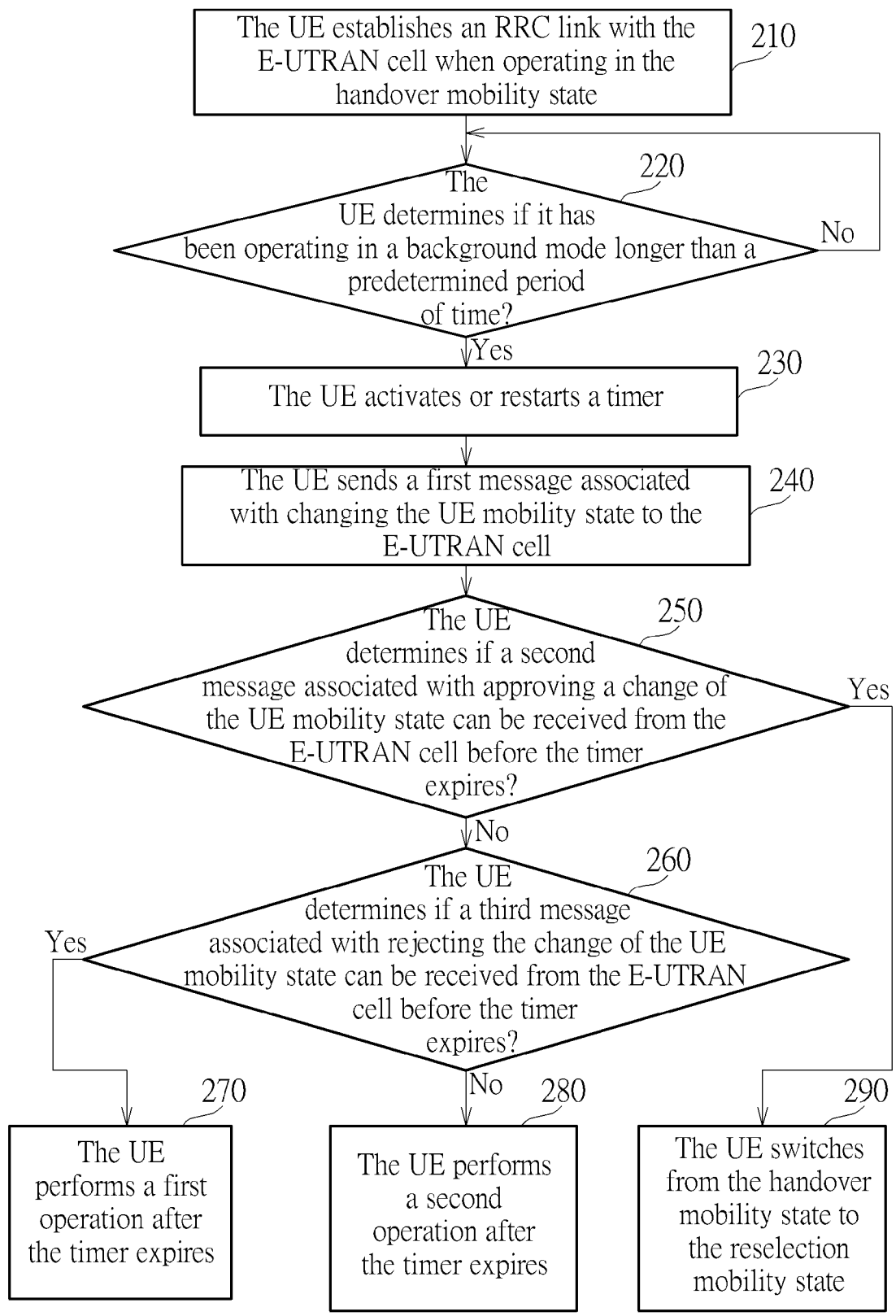
FIG. 2 is a flowchart illustrating a method of changing a UE mobility state in the RRC connected based on background traffic according to an embodiment of the present invention.

FIG. 2 is a flowchart illustrating a method of changing the UE mobility state in the RRC connected based on background traffic according to an embodiment of the present invention. The method in FIG. 2 includes the following steps:

Step 210: the UE establishes an RRC link with the E-UTRAN cell when operating in the handover mobility state; execute step 220.

Step 220: the UE determines if it has been operating in a background mode longer than a predetermined period of time; if yes, execute step 230; if no; execute step 220.

Step 230: the UE activates or restarts a timer; execute step 240.

Step 240: the UE sends a first message associated with changing the UE mobility state to the E-UTRAN cell; execute step 250.

Step 250: the UE determines if a second message associated with approving a change of the UE mobility state can be received from the E-UTRAN cell before the timer expires; if yes, execute step 290; if no; execute step 260.

Step 260: the UE determines if a third message associated with rejecting the change of the UE mobility state can be received from the E-UTRAN cell before the timer expires; if yes, execute step 270; if no; execute step 280.

Step 270: the UE performs a first operation after the timer expires.

Step 280: the UE performs a second operation after the timer expires.

Step 290: the UE switches from the handover mobility state to the reselection mobility state.

In step 210, the UE may receive RRC configuration from the E-UTRAN cell and establishes the RRC link with the E-UTRAN cell based on the RRC configuration when operating in the handover mobility state. As previously states, when operating in the handover mobility state, the UE is able to maintain real-time communication with the E-UTRAN cell, but at the cost of higher power consumption.

When a specific application program currently run on the UE is user interactive, it has higher demand on data latency since the user is actively involved in the operation of the specific application program. When a specific application program currently run on the UE is non-user interactive, it has lower demand on data latency since the user is not actively involved in the operation of the specific application program. For example, the non-user interactive telecommunications application software can be executed in the background of the UE with longer data latency because immediate receipt of each instant message may not necessary when the user is reading an article on the user interactive E-book interface. Once the user switches to the interface of the telecommunications application software, immediate receipt of each instant message become necessary. The telecommunications application software now becomes user interactive and needs to be executed with shorter data latency for maximum performance.

In step 220, the UE is configured to determine if it has been operating in the background mode longer than the predetermined period of time. In an embodiment of the present invention, the definition of "the UE operating in the background mode" is that all application programs currently on the UE are non-user interactive. Under such circumstance, the reselection mobility with lower power consumption can meet the requirement for data latency. Therefore, when it is determined in step 220 that the UE has been operating in the background mode longer than the predetermined period of time, the UE is configured to activate or restart the timer in step 230 and send the first message to the E-UTRAN cell in step 240. By sending the first message associated with changing the UE mobility state, the UE may inform the E-UTRAN cell that the UE is ready to switch to the reselection mobility state, or request a switch in the mobility state from the E-UTRAN cell.

In an embodiment of the present invention, the method of changing the UE mobility state in the RRC connected mode based on background traffic can be activated and designated by the UE. In step 240, the UE may send the first message to the E-UTRAN cell, thereby informing the E-UTRAN cell that the UE is ready to switch to the reselection mobility state. The first message may be an over-the-air (OTA) message which includes information of the target mobility state (reselection mobility state). After receiving the OTA message associated with changing the UE mobility state, the E-UTRAN cell may send the second message to the UE. The second message may include acknowledgment information associated with approving the change of the UE mobility state, or may further include a new radio resource configuration associated with the target mobility state.

In an embodiment of the present invention, the method of changing the UE mobility state in the RRC connected mode based on background traffic can be activated by the UE and designated by the E-UTRAN cell. In step 240, the UE may send the first message to the E-UTRAN cell, thereby requesting a switch in the mobility state from the E-UTRAN cell. The first message may be an OTA message which indicates that the UE has met the condition of switching mobility state. After receiving the OTA message associated with changing the UE mobility state, the E-UTRAN cell may send the second message to the UE. The second message may include information associated with the target mobility state (reselection mobility state) assigned by the E-UTRAN cell, or may further include a new radio resource configuration associated with the target mobility state.

If it is determined in step 250 that the second message can be received from the E-UTRAN cell before the timer expires, the second message may or may not include the new radio resource configuration associated with the target mobility state (reselection mobility state). If the second message includes the new radio resource configuration, the UE is configured to switch from the handover mobility state to the reselection mobility state based on the new radio resource configuration in step 290; if the second message does not include the new radio resource configuration, the UE is configured to switch from the handover mobility state to the reselection mobility state based on an existing radio resource configuration, which was used to establish the first link, in step 290.

If it is determined in step 250 that the second message cannot be received from the E-UTRAN cell before the timer expires, the UE is configured to determine if the third message associated with rejecting the change of the UE mobility state can be received from the E-UTRAN cell before the timer expires. In certain situation, the E-UTRAN cell may request the UE to remain in the current handover mobility state by sending the third message associated with rejecting the change of the UE mobility state to the UE for some reason, such as for the purpose of maintaining real-time communication between the UE and the E-UTRAN cell. Upon receiving the third message, the UE is configured to perform the first operation in step 270

In the embodiment illustrated in FIG. 2, the first operation may include any of the following steps:

(1) the UE switches from the RRC connected mode to the RRC idle mode;

(2) the UE remains in the current handover mobility state;

(3) the UE remains in the current handover mobility state and re-executes step 240 when the UE has operated in the background mode longer than the predetermined period of time after having received the third message.

If the E-UTRAN cell is heavily loaded, the UE may not be able to receive the second message or the third message before the timer expires in steps 250 and 260. Under such circumstance, the UE is configured to perform the second operation in step 280

In the embodiment illustrated in FIG. 2, the second operation may include any of the following steps:

(1) the UE switches from the RRC connected mode to the RRC idle mode;

(2) the UE remains in the current handover mobility state;

(3) the UE remains in the current handover mobility state and re-executes step 240 when the UE has operated in the background mode longer than the predetermined period of time after the timer expires;

(4) the UE re-establishes an RRC link with the E-UTRAN cell.

Figure 3:
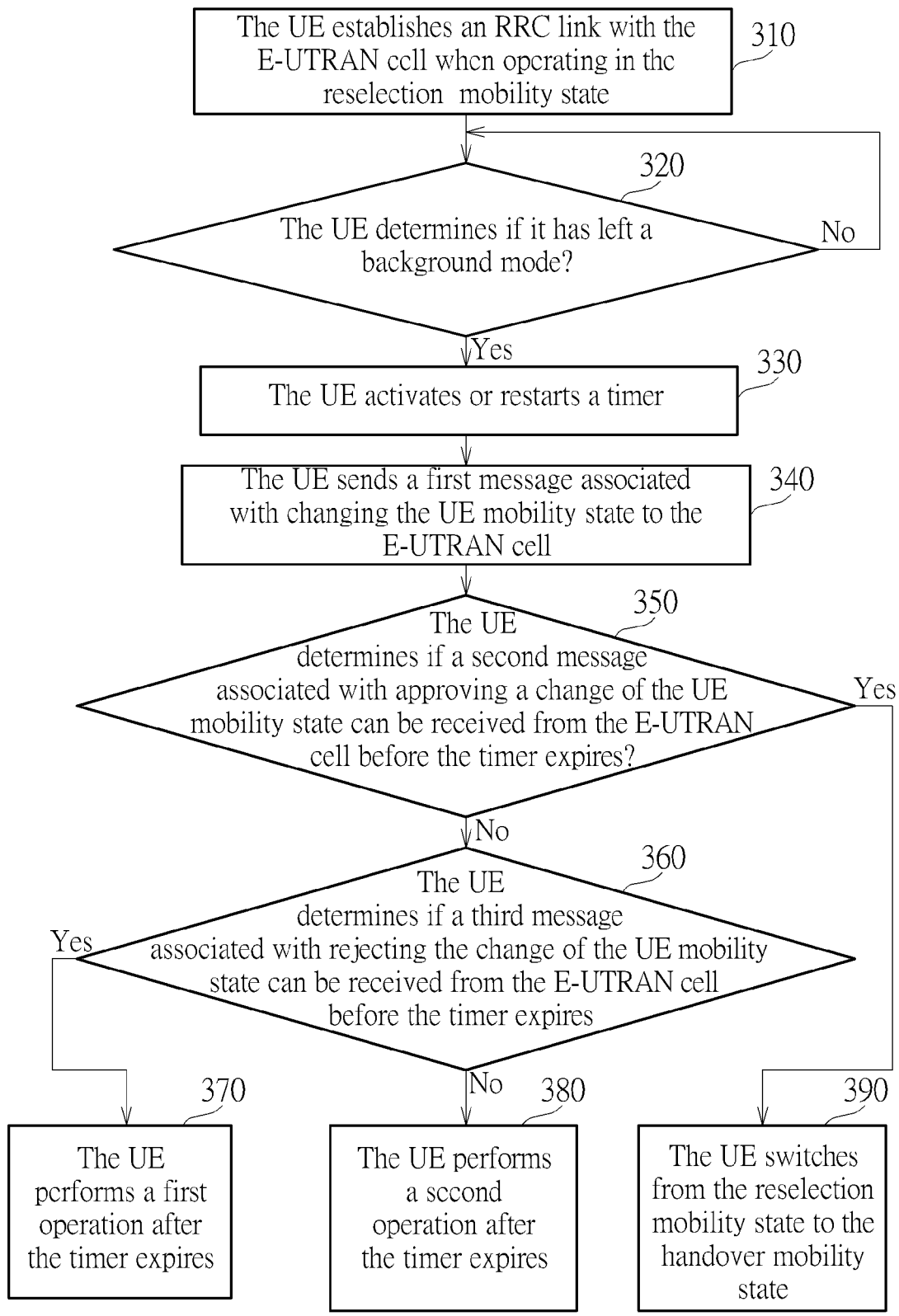
FIG. 3 is a flowchart illustrating a method of changing a UE mobility state in the RRC connected based on background traffic according to another embodiment of the present invention.

FIG. 3 is a flowchart illustrating a method of changing the UE mobility state in the RRC connected based on background traffic according to another embodiment of the present invention. The method in FIG. 3 includes the following steps:

Step 310: the UE establishes an RRC link with the E-UTRAN cell when operating in the reselection mobility state; execute step 320.

Step 320: the UE determines if it has left a background mode; if yes, execute step 330; if no; execute step 320.

Step 330: the UE activates or restarts a timer; execute step 340.

Step 340: the UE sends a first message associated with changing the UE mobility state to the E-UTRAN cell; execute step 350.

Step 350: the UE determines if a second message associated with approving a change of the UE mobility state can be received from the E-UTRAN cell before the timer expires; if yes, execute step 390; if no; execute step 360.

Step 360: the UE determines if a third message associated with rejecting the change of the UE mobility state can be received from the E-UTRAN cell before the timer expires; if yes, execute step 370; if no; execute step 380.

Step 370: the UE performs a first operation after the timer expires.

Step 380: the UE performs a second operation after the timer expires.

Step 390: the UE switches from the reselection mobility state to the handover mobility state.

In step 310, the UE may receive RRC configuration from the E-UTRAN cell and establishes the RRC link with the E-UTRAN cell based on the RRC configuration when operating in the reselection mobility state. As previously states, the UE can reduce power consumption by operating in the reselection mobility state, but is unable to maintain real-time communication with the E-UTRAN cell.

In step 320, the UE is configured to determine if it has left the background mode. In an embodiment of the present invention, when any of the application programs currently on the UE starts to receive active user commands, the UE is configured to leave the background mode. Under such circumstance, the reselection mobility cannot meet the requirement for short data latency. Therefore, when it is determined in step 320 that the UE has left the background mode, the UE is configured to activate or restart the timer in step 330 and send the first message to the E-UTRAN cell in step 340. By sending the first message associated with changing the UE mobility state, the UE may inform the E-UTRAN cell that the UE is ready to switch to the handover mobility state, or request a switch in the mobility state from the E-UTRAN cell.

In an embodiment of the present invention, the method of changing the UE mobility state in the RRC connected mode based on background traffic can be activated and designated by the UE. In step 340, the UE may send the first message to the E-UTRAN cell, thereby informing the E-UTRAN cell that the UE is ready to switch to the handover mobility state. The first message may be an OTA message which includes information of the target mobility state (handover mobility state). After receiving the OTA message associated with changing the UE mobility state, the E-UTRAN cell may send the second message to the UE. The second message may include acknowledgment information associated with approving the change of the UE mobility state, or may further include a new radio resource configuration associated with the target mobility state.

In an embodiment of the present invention, the method of changing the UE mobility state in the RRC connected mode based on background traffic can be activated by the UE and designated by the E-UTRAN cell. In step 340, the UE may send the first message to the E-UTRAN cell, thereby requesting a switch in the mobility state from the E-UTRAN cell. The first message may be an OTA message which indicates that the UE has met the condition of switching mobility state. After receiving the OTA message associated with changing the UE mobility state, the E-UTRAN cell may send the second message to the UE. The second message may include information associated with the target mobility state (handover mobility state) assigned by the E-UTRAN cell, or may further include a new radio resource configuration associated with the target mobility state.

If it is determined in step 350 that the second message can be received from the E-UTRAN cell before the timer expires, the second message may or may not include the new radio resource configuration associated with the target mobility state (handover mobility state). If the second message includes the new radio resource configuration, the UE is configured to switch from the reselection mobility state to the handover mobility state based on the new radio resource configuration in step 390; if the second message does not include the new radio resource configuration, the UE is configured to switch from the reselection mobility state to the handover mobility state based on an existing radio resource configuration, which was used to establish the first link, in step 390.

If it is determined in step 350 that the second message cannot be received from the E-UTRAN cell before the timer expires, the UE is configured to determine if the third message associated with rejecting the change of the UE mobility state can be received from the E-UTRAN cell before the timer expires in step 360. In certain situation, the E-UTRAN cell may request the UE to remain in the current reselection mobility state by sending the third message associated with rejecting the change of the UE mobility state to the UE for some reason, such as for the purpose of abandoning real-time communication between the UE and the E-UTRAN cell. Upon receiving the third message, the UE is configured to perform the first operation in step 370

In the embodiment illustrated in FIG. 3, the first operation may include any of the following steps:

(1) the UE switches from the RRC connected mode to the RRC idle mode;

(2) the UE remains in the current reselection mobility state;

(3) the UE remains in the current reselection mobility state and re-executes step 340 when the UE has left the background mode longer than the predetermined period of time after having received the third message.

If the E-UTRAN cell is heavily loaded, the UE may not be able to receive the second and third messages before the timer expires in steps 350 and 360. Under such circumstance, the UE is configured to perform the second operation in step 380

In the embodiment illustrated in FIG. 3, the second operation may include any of the following steps:

(1) the UE switches from the RRC connected mode to the RRC idle mode;

(2) the UE remains in the current reselection mobility state;

(3) the UE remains in the current reselection mobility state and re-execute step 340 when the UE has left the background mode longer than the predetermined period of time after the timer expires;

(4) the UE re-establishes an RRC link with the E-UTRAN cell.

Figure 4:
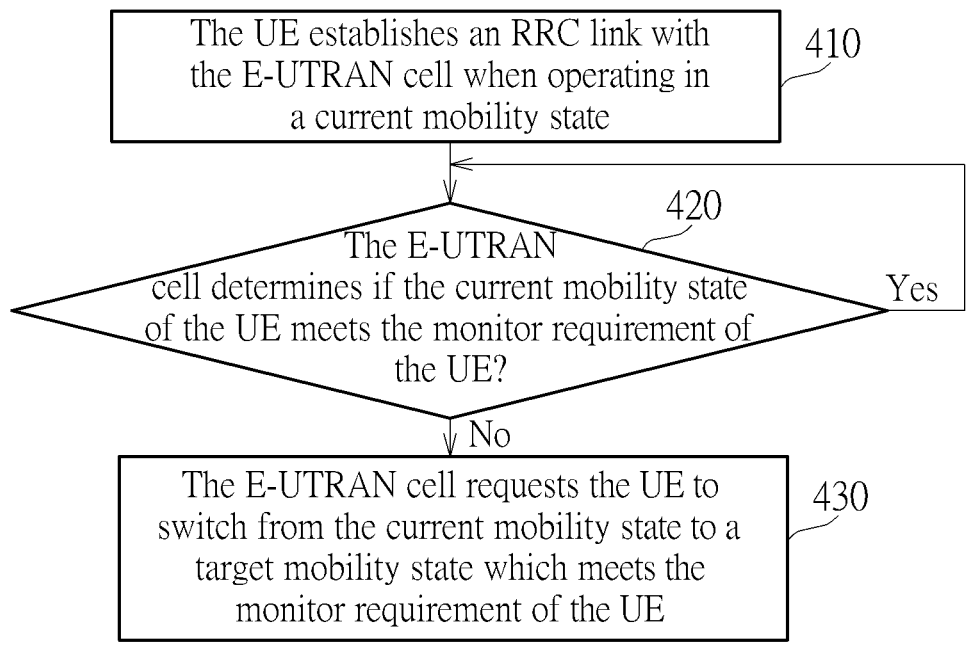
FIG. 4 is a flowchart illustrating a method of changing a UE mobility state in the RRC connected based on monitor requirement according to an embodiment of the present invention.

FIG. 4 is a flowchart illustrating a method of changing the UE mobility state in the RRC connected based on monitor requirement according to an embodiment of the present invention. The method in FIG. 4 includes the following steps:

Step 410: the UE establishes an RRC link with the E-UTRAN cell when operating in a current mobility state; execute step 420.

Step 420: the E-UTRAN cell determines if the current mobility state of the UE meets the monitor requirement of the UE; if yes, execute step 420; if no; execute step 430.

Step 430: the E-UTRAN cell requests the UE to switch from the current mobility state to a target mobility state which meets the monitor requirement of the UE.

In an embodiment of FIG. 4, the current mobility state is the handover mobility state and the target mobility state is the reselection mobility state. In step 410, the UE is configured to establish the RRC link with the E-UTRAN cell when operating in the handover mobility state of the RRC connected mode. In step 420, the E-UTRAN cell may determine that the current mobility state of the UE meets the monitor requirement of the UE when the E-UTRAN cell demands a real-time communication with the UE. Under such circumstance, no request of switching mobility state will be sent to the UE. In step 420, the E-UTRAN cell may determine that the current mobility state of the UE does not meet the monitor requirement of the UE when the E-UTRAN cell does not want a real-time communication with the UE. Under such circumstance, the E-UTRAN cell is configured to request the UE to switch from the current handover mobility state to the target reselection mobility state in step 430.

In an embodiment of FIG. 4, the current mobility state is the reselection mobility state and the target mobility state is the handover mobility state. In step 410, the UE is configured to establish the RRC link with the E-UTRAN cell when operating in the reselection mobility state of the RRC connected mode. In step 420, the E-UTRAN cell may determine that the current mobility state of the UE meets the monitor requirement of the UE when the E-UTRAN cell does not want a real-time communication with the UE. Under such circumstance, no request of switching mobility state will be sent to the UE. In step 420, the E-UTRAN cell may determine that the current mobility state of the UE does not meet the monitor requirement of the UE when the E-UTRAN cell demands a real-time communication with the UE. Under such circumstance, the E-UTRAN cell is configured to request the UE to switch from the current reselection mobility state to the target handover mobility state in step 430.

In the present invention, the methods depicted in FIGS. 2-4 may be performed separately or in any combination. For example, the present method may include executing steps 210-290 and 310-390 sequentially, executing steps 310-390 and 210-290 sequentially, executing steps 210-290 and 410-430 during the same period, or executing steps 310-390 and 410-430 during the same period.

In the present invention, the UE mobility state in the RRC connected mode may be adjusted according to background traffic or monitor requirement. Background traffic caused by non-user interactive application programs no longer increases power consumption. Since the UE mobility state may be changed based on different data latency requirements for user interactive application programs and non-user interactive application programs, the present method can reduce handover failure rate. Also, the present invention can ensure that the current mobility state of the UE meets the monitor requirement from the network, thereby reducing unnecessary power consumption or handover failure rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of changing a user equipment mobility state based on background traffic, comprising:
   a user equipment establishing a first radio resource control (RRC) link with a cell when operating in a first mobility state of an RRC connected mode;
   the user equipment sending a first message to the cell when the user equipment remains operating in a background mode longer than a predetermined period of time after having established the first RRC link; and
   the user equipment switching from the first mobility state to a second mobility state of the RRC connected mode when the user equipment is able to receive a second message from the cell before a first timer expires, wherein:
   the first message is associated with changing the user equipment mobility state;
   the second message is associated with approving a change of the user equipment mobility state;
   a first monitor frequency of the user equipment when operating in the first mobility state is higher than a second monitor frequency of the user equipment when operating in the second mobility state; and
   all application programs run on the user equipment are non-user interactive when the user equipment operates in the background mode.

2. The method of claim 1, wherein:
   the user equipment sending the first message to the cell is to inform the cell that the user equipment is ready to switch to the second mobility state;
   the second message includes acknowledgment information or further includes a new radio resource configuration associated with the second mobility state; and
   the acknowledgment information indicates that the cell approves the change of the user equipment mobility state.

3. The method of claim 2, wherein:
   the user equipment is configured to switch from the first mobility state to the second mobility state based on the new radio resource configuration or based on an existing radio resource configuration which was used for establishing the first RRC link.

4. The method of claim 1, wherein:
   the user equipment sending the first message to the cell is to inform the cell that the user equipment has met a condition for changing the user equipment mobility state; and
   the second message includes information which instructs the user equipment to switch to the second mobility state, or further includes a new radio resource configuration associated with the second mobility state.

5. The method of claim 4, wherein:
   the user equipment is configured to switch from the first mobility state to the second mobility state based on the new radio resource configuration or based on an existing radio resource configuration which was used for establishing the first RRC link.

6. The method of claim 1, wherein:
the user equipment performing a first operation when the user equipment is unable to receive the second message but is able to receive a third message from the cell before the first timer expires; and
the user equipment performing a second operation when the user equipment is unable to receive the second message or the third message from the cell before the first timer expires, wherein:
the third message is associated with rejecting the change of the user equipment mobility state;
the first operation includes:
  the user equipment switching from the RRC connected mode to an RRC idle mode;
  the user equipment remaining in the first mobility state; or
  the user equipment remaining in the first mobility state and re-sending the first message to the cell when the user equipment remains operating in the background mode longer than the predetermined period of time after having received the third message; and
the second operation includes:
  the user equipment switching from the RRC connected mode to the RRC idle mode;
  the user equipment remaining in the first mobility state;
  the user equipment remaining in the first mobility state and re-sending the first message to the cell when the user equipment remains operating in the background mode longer than the predetermined period of time after having received the third message; or
  the user equipment establishing a second RRC link with the cell.

7. The method of claim 6, wherein the first message, the second message and the third message are over-the-air (OTA) messages.

8. The method of claim 1, further comprising:
the user equipment maintaining the first RRC link in the second mobility state after switching from the first mobility state to the second mobility state;
the user equipment sending a third message to the cell when the user equipment leaves the background mode after switching from the first mobility state to the second mobility state; and
the user equipment switching from the second mobility state to the first mobility state when the user equipment is able to receive a fourth message from the cell before a second timer expires, wherein:
  the third message is associated with changing the user equipment mobility state; and
  the fourth message is associated with approving the change of the user equipment mobility state.

9. The method of claim 1, wherein the cell is an evolved universal terrestrial radio access network (E-UTRAN) base station in a $4^{th}$ Generation (4G) long term evolution (LTE) system.

* * * * *